United States Patent
Kishida

(10) Patent No.: US 7,279,671 B2
(45) Date of Patent: Oct. 9, 2007

(54) IMAGE ACQUISITION APPARATUS FOR USE WITH A MICROSCOPE INCLUDING DETECTION OF THE AMOUNT OF CHANGE BETWEEN AND IMAGE AND A SUBSEQUENT IMAGE, AND AN IMAGE RECORDING SYSTEM THAT USE THE IMAGE ACQUISITION APPARATUS

(75) Inventor: Hironori Kishida, Hachioji (JP)

(73) Assignee: Olympus Corporation, Tokyo (JP)

( * ) Notice: Subject to any disclaimer, the term of this patent is extended or adjusted under 35 U.S.C. 154(b) by 15 days.

(21) Appl. No.: 11/345,313

(22) Filed: Feb. 2, 2006

(65) Prior Publication Data
US 2006/0171023 A1    Aug. 3, 2006

(30) Foreign Application Priority Data
Feb. 3, 2005    (JP)    ............... 2005-027784

(51) Int. Cl.
*H01L 27/00*    (2006.01)
(52) U.S. Cl. ................... 250/208.1; 250/201.3
(58) Field of Classification Search ............ 250/208.1, 250/201.3, 201.5, 306, 307, 311; 382/243, 382/232, 305
See application file for complete search history.

(56) References Cited

U.S. PATENT DOCUMENTS 6,337,472 B1 *   1/2002   Garner et al. ............ 250/201.3
6,337,928 B1     1/2002   Takahashi et al.
6,654,498 B2     11/2003  Takahashi et al.
2002/0024589 A1  2/2002   Takahashi et al.
2004/0036807 A1  2/2004   Takahashi et al.

FOREIGN PATENT DOCUMENTS

| JP | 10-66074 | 3/1998 |
|---|---|---|
| JP | 2002-335492 | 11/2002 |
| JP | 2004-7089 | 1/2004 |

* cited by examiner

*Primary Examiner*—Que T Le
(74) *Attorney, Agent, or Firm*—Arnold International; Jon W. Henry; Bruce Y. Arnold

(57) ABSTRACT

An image acquisition apparatus is disclosed that includes: an image pickup element that acquires images obtained using a microscope; a change detector that detects the amount of change between an image acquired by the image pickup element and a subsequent image acquired by the image pickup element; and a data-reduction processor that enables reduced-data images to be output, as well as images that have not been subject to data reduction or that have been subject to a different rate of data-reduction depending on the amount of change detected by the change detector. An image recording system that uses the image acquisition apparatus is also disclosed, as well as an associated method.

15 Claims, 14 Drawing Sheets

| | K=0 | K=1 |
|---|---|---|
| SEL | Thinning | Through ( no processing ) |
| SEL | Binning | Through ( no processing ) |

| Frame | 1 | 2 | 3 | 4 | 5 | 6 | 7 | 8 | 9 | 10 | 11 | 12 |
|---|---|---|---|---|---|---|---|---|---|---|---|---|
| K | 0 | | | | | 1 | | | | 0 | | |
| SEL | | | | | | | | | | | | |
| Output Image | Thinning | | | | | No Processing | | | | Thinning | | |

Fig. 8

| Frame | 1 | 2 | 3 | 4 | 5 | 6 | 7 | 8 | 9 | 10 | 11 | 12 |
|---|---|---|---|---|---|---|---|---|---|---|---|---|
| K | 0 | | | | | 1 | | | 0 | | | |
| SEL | | | | | Binning | | | | | | | |
| Output Image | | Binning | | | | | No Processing | | | | Binning | |

Fig. 9

|  | K=1 | K=0 |
|---|---|---|
| Binning | None | 2 × 2 |
| Illumination Level | I | I / 4 |
Fig. 11
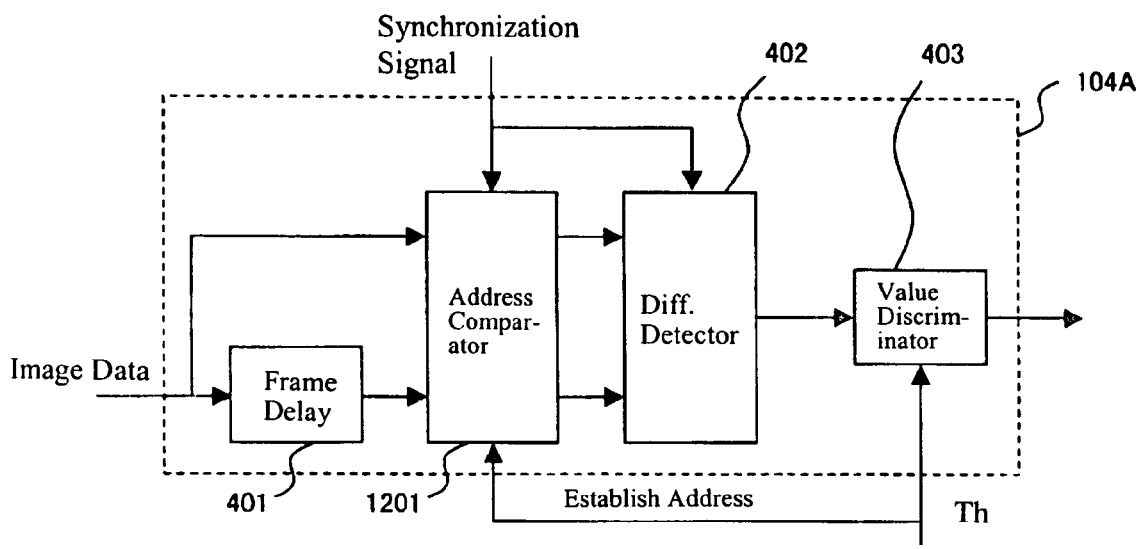
Fig. 12
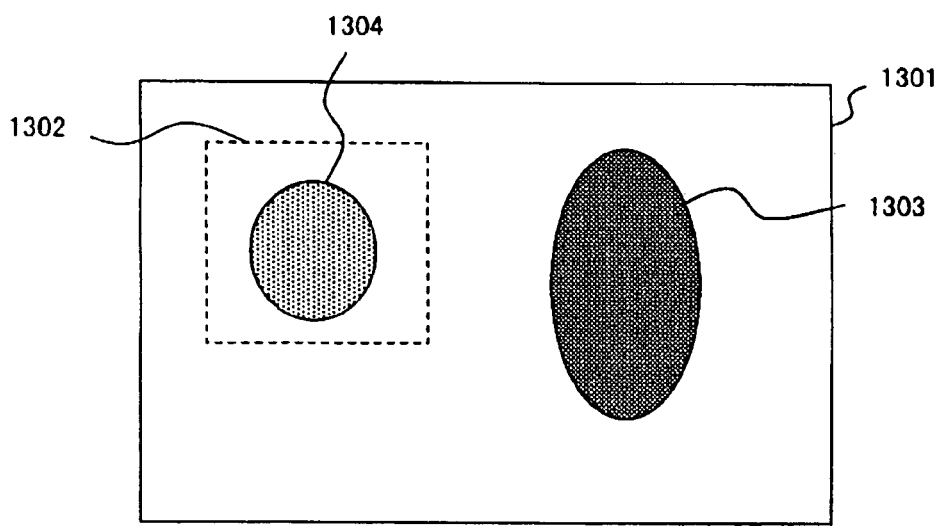
Fig. 13

|  | K=0 | K=1 |
|---|---|---|
| Compression Ratio | A : Large | B : Small |

Fig. 15

| | K=0 | K=1 |
|---|---|---|
| Frame Thinning | N Frame Cycle Thinning | No Thinning |
Fig. 17
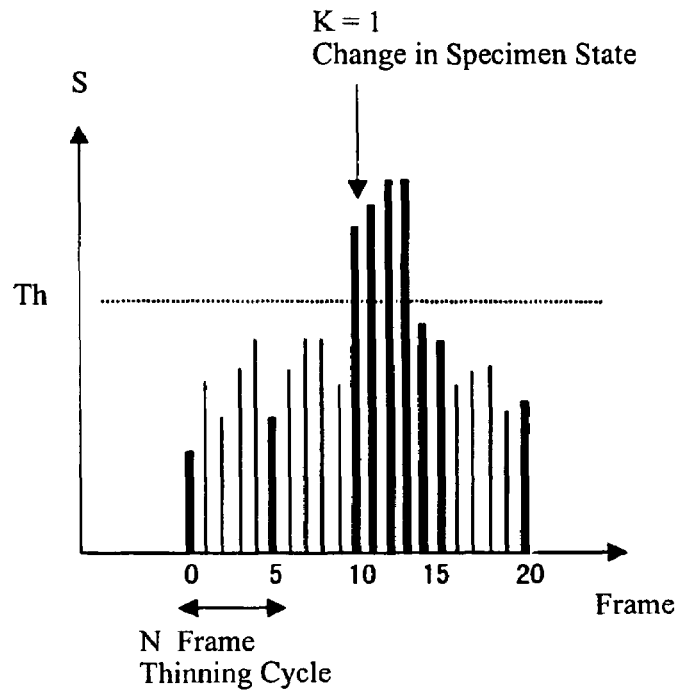
Fig. 18
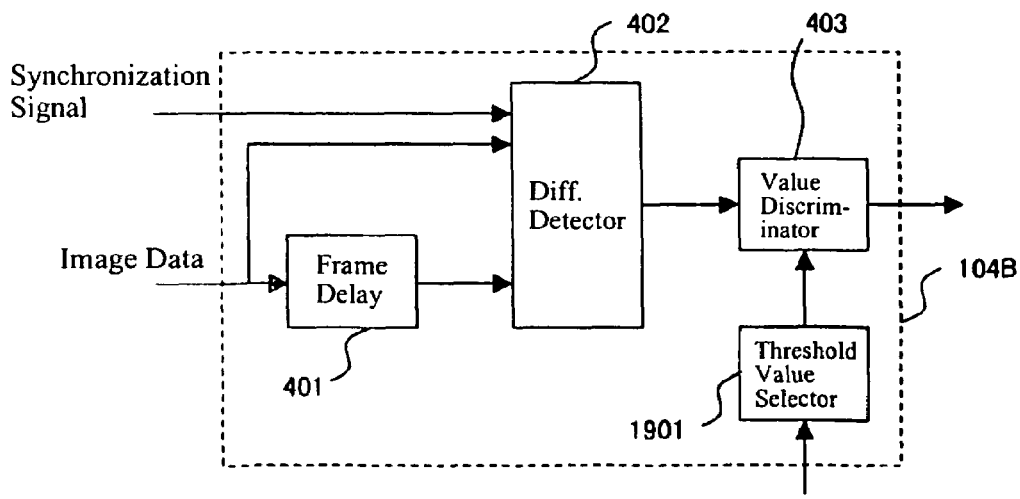
Fig. 19

IMAGE ACQUISITION APPARATUS FOR USE WITH A MICROSCOPE INCLUDING DETECTION OF THE AMOUNT OF CHANGE BETWEEN AND IMAGE AND A SUBSEQUENT IMAGE, AND AN IMAGE RECORDING SYSTEM THAT USE THE IMAGE ACQUISITION APPARATUS

CROSS-REFERENCE TO RELATED APPLICATION

This application claims the benefit of priority of JP 2005-027784, filed Feb. 3, 2005, the contents of which are hereby incorporated by reference.

BACKGROUND OF THE INVENTION

The present invention relates to an image acquisition apparatus for use with a microscope, an image recording system that uses the image acquisition apparatus, and an image storage method. More specifically, the present invention relates to an image acquisition apparatus for use with a microscope, a microscope system that uses the image acquisition apparatus and stores image data, and an image storage method wherein an appropriate storage procedure is performed depending on the amount of change detected when successively acquired images of a specimen are compared.

Conventionally, in order to store images of objects observed by a microscope, utilization has been made of a method of photography that employs a silver salt film camera. Recently, methods of photographing objects utilizing electronic cameras (termed 'digital cameras') have become popular.

In the medical and science sectors, multiple applications have been provided that observe living cells as an object and, in order to observe changes of the living cells over time, imaging apparatuses for microscopes (i.e., microscope cameras) have been developed that record what will be termed herein as 'ordinary' motion picture images (wherein motion picture images are successively acquired at the normal rate for motion pictures over a continuous period, as in an ordinary movie), as well as apparatuses for microscopes that record time-lapse photography images, and the like.

Generally, in executing motion picture recording, time-lapse photography recording, and so on, the amount of photographic image data obtained is limited by the storage capacity of the storage medium that is to store the photographic image data, and the needless consumption of storage capacity is to be avoided since it increases costs. Thus, a photographic device for use with a microscope has previously been developed that accomplishes detailed storage of only the required image data. It does this by "thinning" unnecessary image data from among photographed image data, as described in Japanese Laid-Open Patent Application No. H10-66074.

However, in a photographic apparatus that performs ordinary motion picture recording of images, it is preferred that the frame rate not be reduced. Therefore, in order to reduce the amount of image data during ordinary motion picture recording, various techniques have been applied which change (i.e., lower) the resolution of the recorded image (e.g., by compressing the image data). As a result, images desired by an observer and in which living cells change in appearance over a short period of time may not be recorded with an adequate resolution or picture quality.

Furthermore, in terms of a desired visual phenomenon to be recorded, recording of images has generally been accomplished wherein a specimen image is obtained in some manner in order to provide an image having adequate resolution and picture quality. In the case of increasing the degree of resolution and accomplishing ordinary motion picture recording, if the period in which an observed object generates a desired phenomenon is short relative to the period of photographic recording, the majority of the data obtained will have an unnecessarily high degree of image resolution, resulting in the capacity of the storage medium being needlessly consumed.

BRIEF SUMMARY OF THE INVENTION

The present invention provides an image acquisition apparatus for use with a microscope, an image recording system that uses the image acquisition apparatus, and an image storage method that is computer-implemented. In the image acquisition apparatus and in the image recording method of the present invention, the acquisition of images (and hence the subsequent recording of the acquired data) is made dependent on the amount of change between two images that are photographed at different times.

The image recording method of the present invention acquires successive photographic images of a specimen observed by a microscope, detects the amount of change between two images of the specimen acquired at different times and, depending in part on the amount of change that is detected, either performs image processing to reduce the number of pixels acquired so as to reduce data storage requirements or performs no processing so that a high quality image may be recorded during periods when the appearance of the specimen changes. Either motion picture images or time-lapse photography images may be recorded using the recording system and method of the invention.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 8 shows the state of the output image signal corresponding to the selection signal SEL and the comparison result signal K in the case where the selection signal SEL is set for the thinning mode of reduced-data image acquisition;

FIG. 9 shows the state of the output image signal corresponding to the selection signal SEL and the comparison result signal K in the case where the selection signal SEL is set for the binning mode of reduced-data image acquisition;

FIG. 11 shows the relationship between the relative amount of illumination light required during binning processing (K=0) versus no processing (K=1) according to Embodiment 2;

FIG. 12 is a block diagram that shows the components of a change detector 104A of a microscope system according to Embodiment 3;

FIG. 13 shows a scaled display image that may be displayed on the display 109 shown in FIG. 10;

FIG. 15 shows the relative image compression ratio that depends on the comparison result signal K in Embodiment 4;

FIG. 17 is a table that illustrates the frame thinning status versus the two possible values of the comparison result signal K in Embodiment 5;

FIG. 18 illustrates how the frame-integrated value S of the illumination difference that is calculated and output from the difference detector within the change detector 104 shown in FIG. 16 changes with frame number when there is a change in specimen state during some of the frames;

FIG. 19 as a block diagram that shows the components of a change detector 104B of a microscope system according to Embodiment 6 of the present invention;

DETAILED DESCRIPTION

A description of Embodiments 1-6 of the invention will now be provided with reference to the drawings.

Embodiment 1

Figure 1:
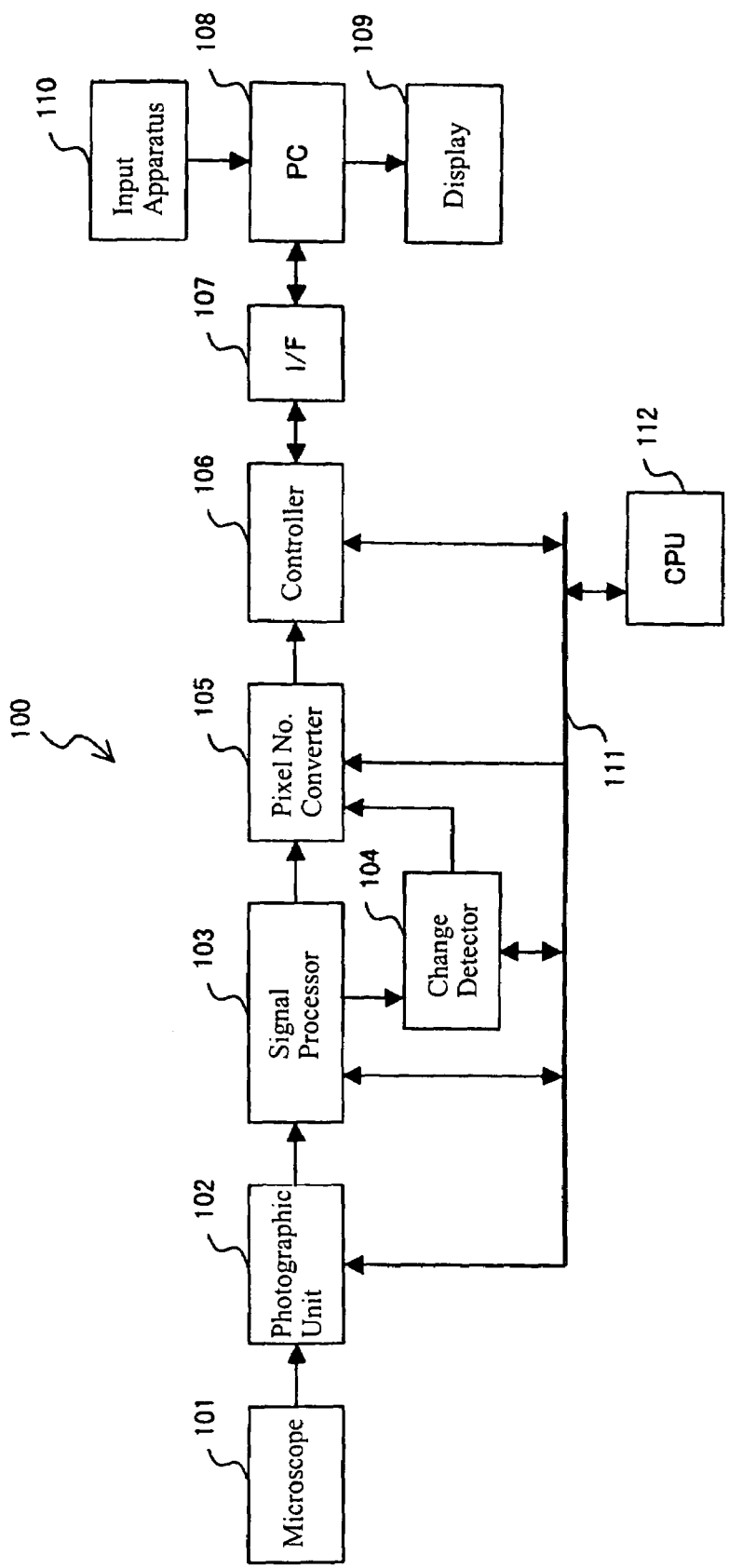
FIG. 1 is a block diagram that shows the components of Embodiment 1 of a microscope system that includes a photographic unit 102, a signal processor 103, a change detector 104, a pixel number converter 105, and other components.

As shown in FIG. 1, a microscope system 100 includes: a microscope 101 that is capable of switching to different types of observation, such as transparent field observation or fluorescent light observation; a photographic unit 102 that forms a relayed image of a specimen that is imaged by the microscope 101; a signal processor 103; a change detector 104; a pixel number converter 105; a controller 106; an interface 107; a personal computer 108 (hereinafter, PC 108); a display 109; an input apparatus 110; and a central processing unit 112 (hereinafter, CPU 112). Also, the CPU 112 is electrically connected to the photographic unit 102, the signal processor 103, the change detector 104, the pixel number converter 105, and the controller 106.

Figure 2:
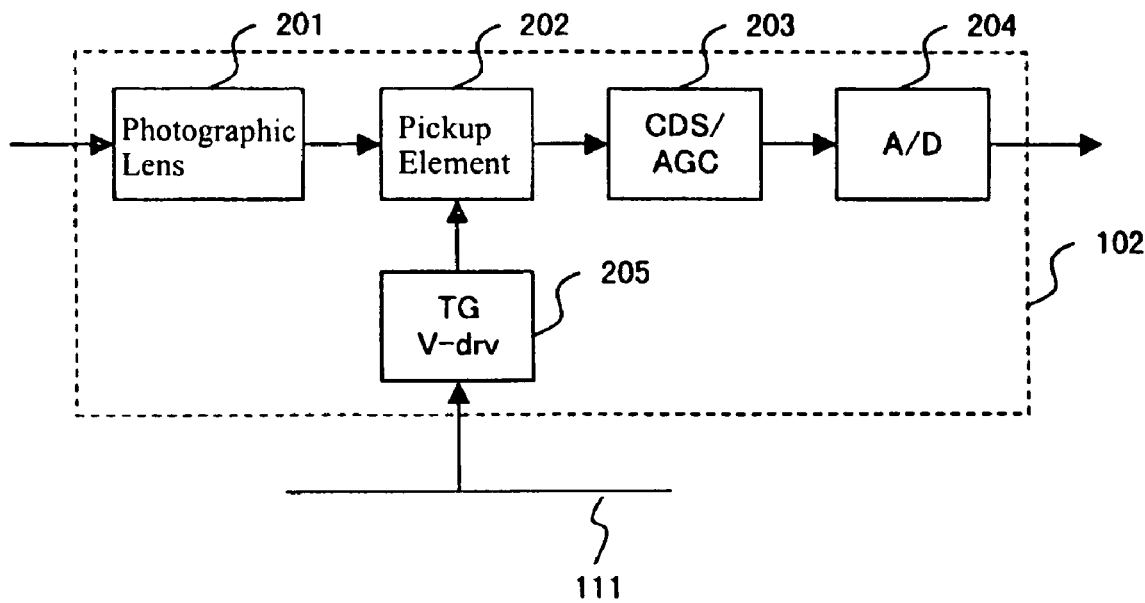
FIG. 2 is a block diagram that shows the components of the photographic unit 102 shown in FIG. 1.

As shown in FIG. 2, the photographic unit 102 includes: a photographic lens 201; an image pickup element 202 such as in an ordinary CCD camera; a known double correlation sampling (CDS)/automatic gain control (AGC) circuit 203 (that performs noise removal and level adjustment, and is hereinafter referred to as 'CDS/AGC circuit 203'); an A/D converter 204; and a drive 205 (which, for example, may be a TGV drive). An image of a specimen that is obtained using the microscope 101 is input into the photographic unit 102, and is relayed onto the image pickup element 202 by the photographic lens 201. The drive 205 is electrically connected to the image pickup element 202, and a control bus 111 carries drive signals in order to drive the image pickup element 202 in a manner determined by the CPU 112 (FIG. 1). For example, the drive 205 may output drive signals to the image pickup element 202 in order to accomplish reduced-data image acquisition in the binning mode, in which case the light exposure converter of the image pickup element 202 (in response to a signal from the CPU 112) calculates and reads out, as one pixel, cumulative image data of multiple adjacent pixels (such as four pixels that, before read-out, form a 2×2 array). The image pickup element 202 photo-electrically converts the incident light corresponding to any of the drive signals from the drive 205.

The photo-electrically converted signal passes through the CDS/AGC circuit 203 and, after being converted into a digital signal by the A/D converter 204, it as well as a synchronization signal that provides frame cycle timing are output to a signal processor 103.

Figure 3:
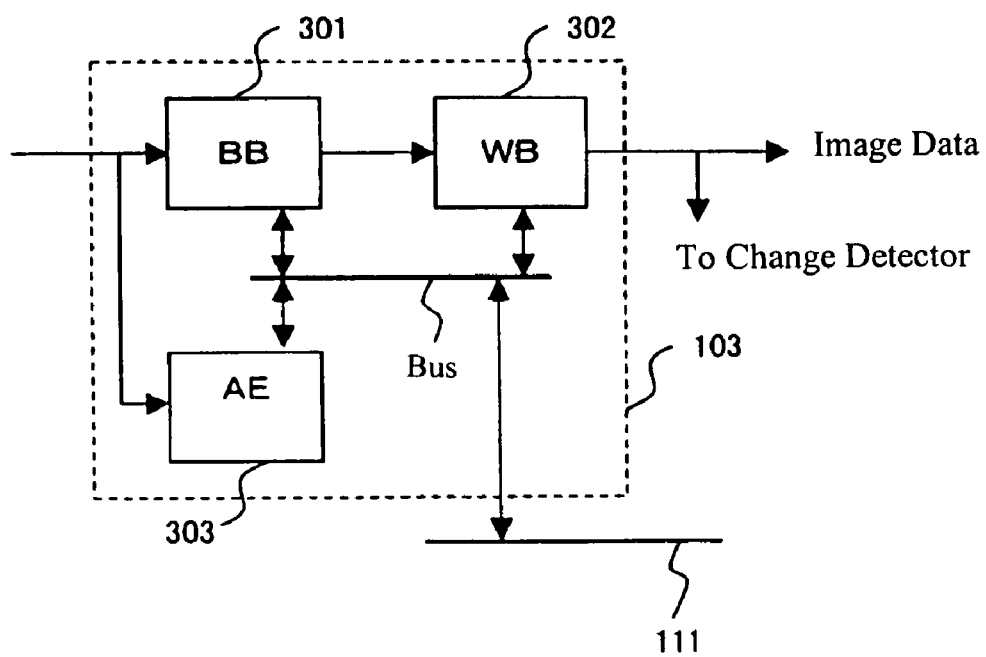
FIG. 3 is a block diagram that shows the components of the signal processor 103 shown in FIG. 1.

As shown in FIG. 3, the signal processor 103 performs image adjustment processing of black balance (BB) correction 301, white balance (WB) correction 302, and the like, on the input image data in response to a setting signal from the CPU 112 that is communicated via the control bus 111 and an internal bus. In addition to outputting image data to the pixel number converter 105 (see FIG. 1), the signal processor 103 outputs a synchronization signal and an image data signal to the change detector 104 (see FIG. 4). In addition, an automatic exposure evaluation unit 303, in order to calculate the exposure time, calculates a necessary exposure value (AE) by integrating the illumination over each frame and transmits it to the CPU 112.

As mentioned above and illustrated in FIGS. 3 and 4, the image data signal and a synchronization signal from the signal processor 103 are input to the change detector 104. The image data signal is input in its existent state into one input of a difference detector 402 and, after being delayed one frame by means of a frame delay unit 401, is also input into another input of the difference detector 402.

The difference detector 402 calculates the illumination difference of the image data signal for pixels of the current frame (i.e., the image data signal input in its existent state from the signal processor 103 versus that of the previous frame (i.e., the frame image data signal after being delayed one frame by the frame delay unit 401). Using the input synchronization signal, it calculates the frame-integrated value S of the illumination difference signals for each frame, and the signal S is then output to a threshold value discriminator 403.

The threshold value discriminator 403 is electrically connected to the CPU 112 by the control bus 111, and a comparison is made by the CPU 112 between a pre-established threshold value Th and the value S, the comparison result of which is sent to the CPU 112 as a comparison result signal K. More specifically, if the frame-integrated value S of the illumination difference is greater than or equal to the threshold value Th (i.e., S≧Th), a "1" is output as the value of K; and if the frame-integrated value S of the illumination difference is smaller than the threshold value Th (i.e., S<Th), a "0" is output as the value of K.

The pixel number converter 105 outputs to the controller 106 either the input image or a reduced-data image that it creates by thinning processing in which the total number of pixels is reduced by a factor of 4 (termed '¼ thinning').

Controller 106 is electrically connected to the PC 108 through the interface 107, and to the CPU 112 through the control bus 111. Conversion of the data format is accomplished, and timing adjustment of the photographic data transmission/reception signal is accomplished between the PC 108 and the CPU 112. In addition, the controller 106 is electrically connected to the pixel number converter 105, and the image data input from the pixel number converter 105 is transmitted to the interface 107.

The interface 107 is provided with an internal buffer memory, and timing adjustment is performed of data communication between the PC 108 and the controller 106. A display 109 and an input apparatus 110 are electrically connected to the PC 108.

The display 109 comprises a monitor such as a TFT display, a CRT, etc. An image is displayed on the monitor corresponding to an output image signal from the PC 108. The input apparatus 110 is electrically connected to the PC 108 and may comprise various devices such as a keyboard, mouse, etc. In addition, the input apparatus 110 may also input photographic timing data to the PC 108.

An explanation will now be provided of the operations executed by the microscope system 100 of the present embodiment.

Figure 5:
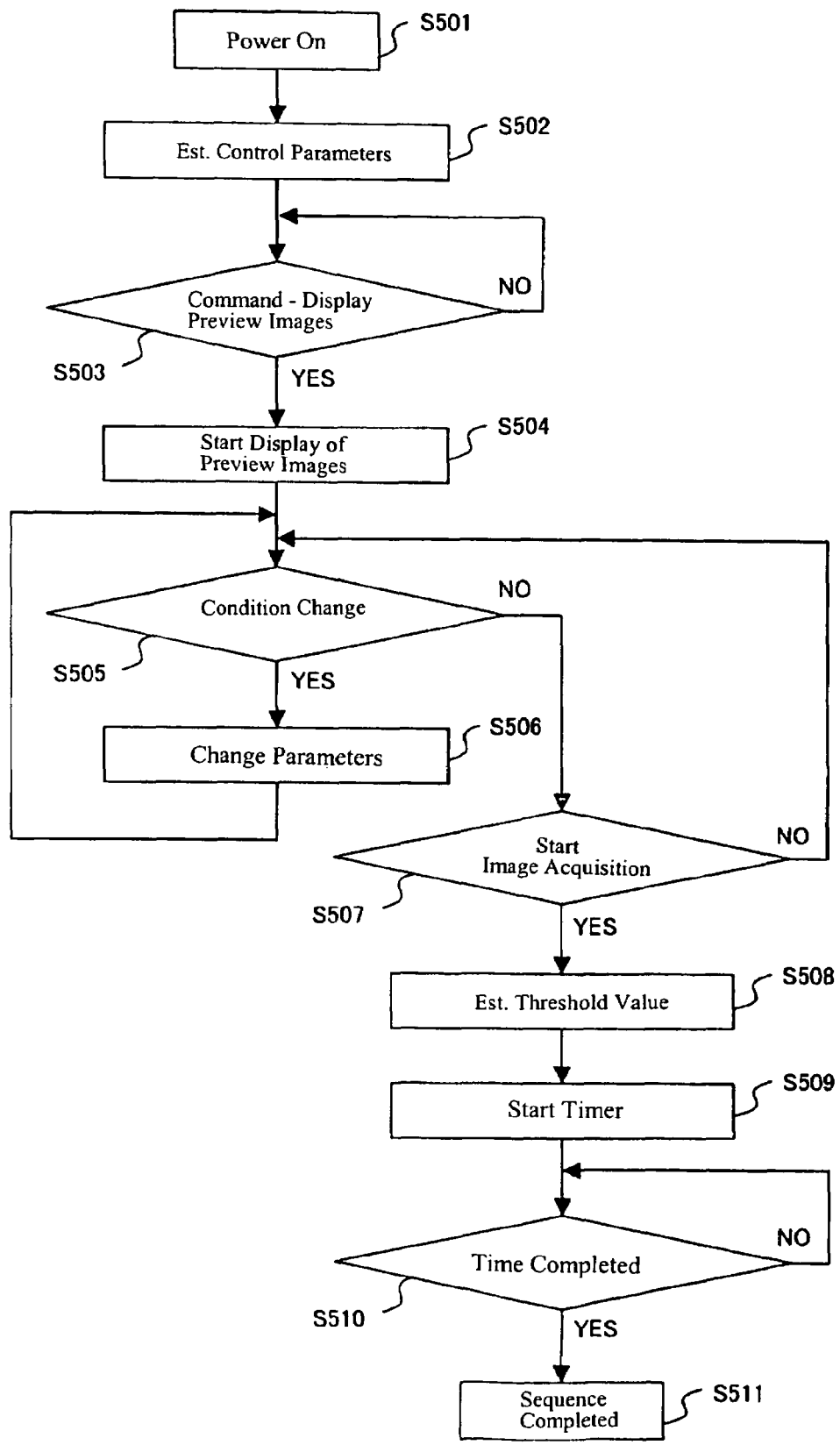
FIG. 5 is a flowchart that shows the successive photographic process steps executed by the microscope system 100 of the first embodiment.

FIG. 5 is a flowchart that shows the flow of the photographic processes that may be executed by the microscope system 100.

First of all, once electric power has been connected to the microscope system 100, the microscope system 100 is turned ON in step S501, and the PC 108 transmits image data to the CPU 112 through the controller 106 in order to acquire a specimen image, with the default photographic conditions being maintained in an internal storage device.

In step S502, the CPU 112 transmits control parameters through the control bus 111 in order to accomplish photographic recording using the image data received from the PC 108.

In step S503, there is a wait period until the receipt of a preview image command and, when notification is provided from the input apparatus 110 to the PC 108 to the effect that the display of preview images should commence, the PC 108 transmits a signal to the CPU 112 indicating that the display of preview images should start. Once this is done, in step S504, the display of preview images is begun.

The following detailed explanation is provided concerning the display of preview images. The CPU 112, upon receiving the signal to commence the display of preview images, directs the drive 205 to commence acquiring image signals. The drive 205 receives the directive and generates a drive signal that is transmitted to the image pickup element 202.

The image pickup element 202, following receipt of the signal from the drive 205, photo-electrically converts a relayed image from the microscope 101 that is incident thereon and outputs a signal. In this instance, in response to a directive from the CPU 112, a drive signal for outputting all of the pixels of the image pickup element 202 is sent from the CPU 112. Thus, the image pickup element 202 photo-electrically converts the incident light for all available pixels. Subsequently, the output signal of the image pickup element 202 passes through the CDS/AGC circuit 203 and, after being converted to digital data by means of the A/D converter 204, is sent to the signal processor 103. In the signal processor 103, image data (which has been processed for white balance correction and black balance correction as discussed above) is output to the change detector 104 and the pixel number converter 105. However, at this time, the change detector 104 is not operational.

The pixel number converter 105 transmits the input image data in its existent state to the controller 106. The controller 106, while accomplishing timing adjustment of the PC 108 through the interface 107, transmits the input image data to the PC 108 which, after converting the input image data to a signal used by the display 109, transmits it to the display 109, on which the specimen image is displayed. The above operation is repeated so as to continuously display preview images of the specimen on the display 109.

In step S505, there is a wait period until receipt of an image condition change command. If no such command is received within the wait period, flow progresses to step S507. When a directive is sent from the input apparatus 110 to the PC 108 indicating that there is a change in the photographic conditions (such as white balance, exposure, etc.), in step S506 the CPU 112 establishes a change in the control parameters based on the image data received from the PC 108 and the display of preview images is changed accordingly.

In step S507, when a directive is received by the PC 108 from the input apparatus 110 to accomplish reduced-data image acquisition using one of thinning mode processing and binning mode processing, or when a directive is received to commence either motion picture acquisition or time-lapse acquisition of images for a specified amount of time, the PC 108 transmits image data via the interface 107 to the CPU 112.

In step S508, the CPU 112 transmits a threshold value Th corresponding to the read image data to the change detector 104, and a selection signal SEL that selects the type of reduced-data acquisition (i.e., the thinning mode or binning mode) is sent to the pixel number converter 105 and the drive 205 that is provided in the photographic unit 102. In this instance, if the binning mode is selected, a drive 205 outputs a drive signal to accomplish reduced-data photographic acquisition using the binning mode, and the exposure time is reduced by a factor of 4. Moreover, a directive for either of thinning mode processing or binning mode processing during reduced-data image acquisition may be pre-established so as to invoke reduced-data image acquisition, or not, depending upon the illumination level (i.e., the brightness) of the image data of one frame.

In step S509, the PC 108 starts an internal timer and simultaneously transmits a control signal that directs the commencement of image acquisition of images intended for recording to the CPU 112, at which time the change detector 104 commences operation. Also, a signal in which incident light of the image relayed from the microscope 101 is photo-electrically converted by the image pickup element 202, is processed in the same manner as when accomplishing the display of preview images, and is output to the pixel number converter 105 and the change detector 104.

As discussed above, the change detector 104 calculates the value S for the input images of two frames in the difference detector 402. In the threshold value discriminator 403, a comparison is made with the threshold value Th that is established in the CPU 112. If the value of S is greater than or equal to the threshold value Th, the comparison result signal K is made to be "1" and is sent as a digital signal to the CPU 112; otherwise the comparison result signal K is made to be "0" and is sent as a digital signal to CPU 112. Also, in the initial first frame, since there is no data from the previous frame, a comparison result signal K of "0" is output.

The CPU 112 acquires the comparison result signal K for each frame. When the selection signal SEL is set to the binning mode and the comparison result signal K is "1" (i.e, the integrated value of the frame difference is determined to be greater than or equal to an established threshold value Th), the drive 205 (FIG. 2) is controlled, and the drive signal of the image pickup element 202 of the following frame is set in the same manner as when accomplishing the display of preview images (i.e., full image-data acquisition). In addition, when the selection signal SEL is set for the binning mode and the comparison result signal K is "0", a drive signal is generated to accomplish image acquisition of the subsequent frame in the binning mode.

The CPU 112 transmits a control signal to the pixel number converter 105. In the change detector 104, if the value of S is determined to be smaller than the established threshold value Th (i.e., if K equals "0"), and if the selection signal SEL is set for the thinning mode of processing, an image is generated in which the number of pixels is reduced by thinning processing; on the other hand, if the integrated value of the frame difference is determined to be greater than or equal to the established threshold value Th (i.e., if K equals "1") and if the selection signal SEL is set for the thinning mode of processing, an image is acquired as when accomplishing the display of preview images (i.e., no thinning processing occurs).

Figures 6, 7:
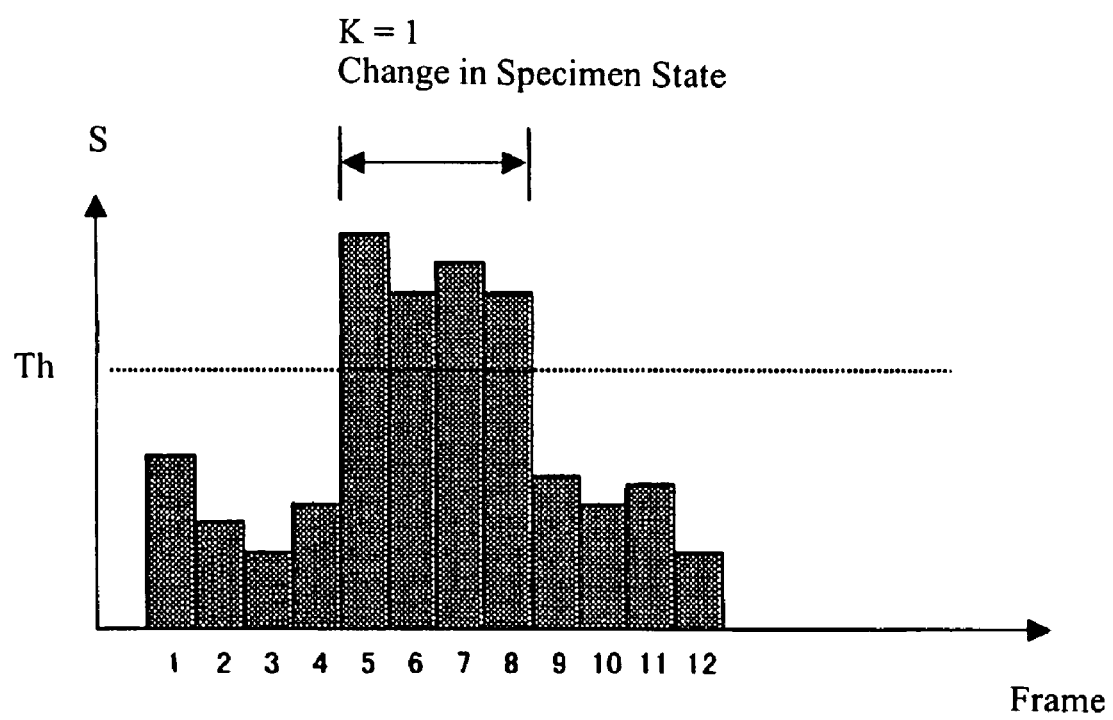
FIG. 6 shows the data format types that may be output from the pixel number converter 105 shown in FIG. 1 depending on a selection signal SEL and a comparison result signal K.
FIG. 7 illustrates how the frame-integrated value S of the illumination difference that is calculated and output from the difference detector 402 shown in FIG. 4 changes with frame number, when there is a change in specimen state during some of the frames, in the case of motion picture recording.

FIG. 6 summarizes the data format that is output by the pixel number converter 105. As discussed above, the selection signal SEL and the comparison result signal K determine the data format that is output by the pixel number converter 105.

The controller 106 transmits image data to the PC 108 while accomplishing timing adjustment of the PC 108 through the interface 107. For example, in the instance of there being a directive for time-lapse acquisition of acquired images, the PC 108 obtains the directed input image data at the directed intervals and, after conversion to a specified still image format, preserves the images in an internal storage apparatus. The operation extending from the above-discussed photography to storage in an external storage apparatus or an internal storage apparatus of the PC 108, is repetitively performed.

In step S510 the PC 108 detects whether the duration for photographic acquisition of images intended for recording (as indicated by the internal timer) has elapsed. If so, in step S511, the PC 108 converts the acquired image data to a specified format. The data may then be stored in an internal or external storage apparatus (not illustrated), and the series of operations is suspended since photographic recording has thus been completed.

An explanation will now be provided concerning the operation of Embodiment 1.

Figure 4:
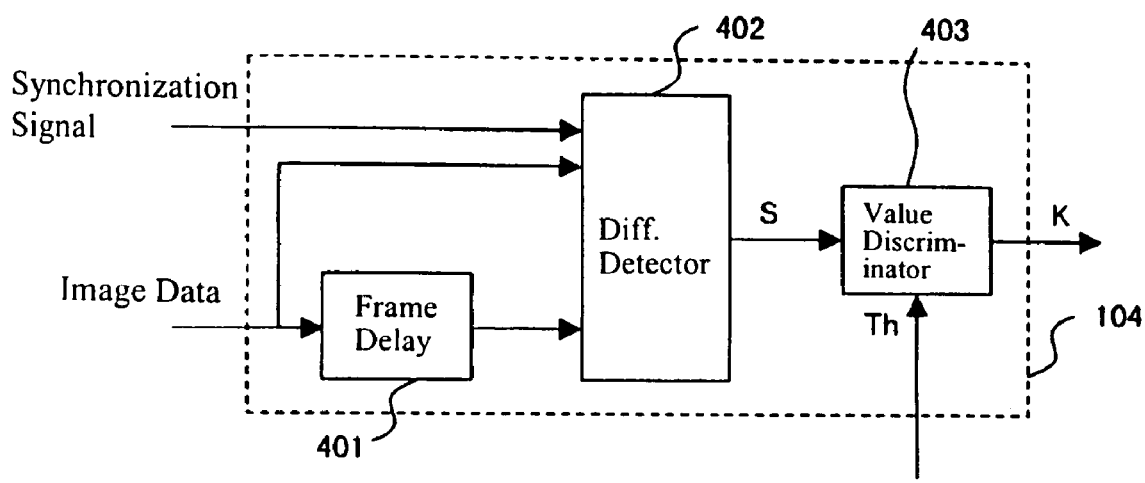
FIG. 4 is a block diagram that shows the components of the change detector 104 shown in FIG. 1.

FIG. 7 illustrates how the frame-integrated value S of the illumination difference (i.e, the signal that is calculated and output from the difference detector 402 shown in FIG. 4 in the case of the display of preview images) changes over different frames when there is a change in specimen state during some of the frames. The frame number is plotted on the horizontal axis and the values of S and Th are plotted on the vertical axis. In this instance, since the threshold value Th is exceeded in frame numbers 5-8, a value of K equals "1" will be output from the threshold value discriminator 403 during those frames. For the other frames illustrated, a value of K equals "0" will be output. In this instance, during frames 5 to 8, there is great change in the image illumination value, and the state of the specimen is determined to be in a period of change in comparison to other periods.

FIG. 8 shows the state of the output images (thinning processing or no thinning processing) of acquired images in frames 1-12 when the selection signal SEL is set for thinning processing of the acquired image data and when the K values for frames 1-12 correspond to those shown in FIG. 7 (i.e., with K equal "1" for frames 5-8 and "0" otherwise).

FIG. 9 shows the state of the output images (binning processing or no binning processing) of acquired images in frames 1-12 when the selection signal SEL is set for binning processing of the acquired images and when the K values for frames 1-12 correspond to those shown in FIG. 7.

As can be seen in FIGS. 8 and 9, when a frame subsequent to when the output results of the threshold value discriminator 403 are such that K=1 (i.e., when the change in the specimen state is determined to be relatively great), the acquired image will be output without receded-data processing (i.e., as in the case of for preview image display). On the other hand, if the output results of the threshold value discriminator 403 are such that K=0 (i.e., when the change in the specimen state is determined to be relatively small), in the subsequent frame an image is output in which the number of pixels (as compared to the number of pixels output during preview image display) is reduced either through thinning processing or binning processing, depending upon whether thinning mode processing or binning mode processing has been designated. If binning mode processing has been designated (wherein the illumination value for each output pixel is determined by addition processing of proximate pixels of the input image), the illumination values of the output will necessarily be large in comparison to the illumination values output in thinning mode processing. This enables the exposure time to be shortened and the frame rate to be increased.

Furthermore, according to Embodiment 1, in acquiring images for motion picture recording or time-lapse photography recording during periods in which the change in appearance from a prior frame is determined to be small, a photographic image is acquired in which the number of pixel elements in the photographic image is reduced. On the other hand, during periods in which the change in appearance from a prior frame is determined to be great, an image is acquired wherein the number of pixels is the same as the number of pixels acquired during the display of preview images (i.e., no reduction of image data). Thus, a photographic recording of a specimen can be accomplished with a sufficiently high resolution during periods in which the change in appearance of the specimen is great. In addition, if the binning mode is selected for a relatively dark specimen (such as where the specimen is imaged using fluorescence from the specimen after the specimen has been illuminated with excitation light), the signal-to-noise ratio of the detected light will increase with binning, this being an inherent feature of binning processing. This enables a high resolution image to be obtained without increasing the intensity of the excitation light. Thus, damage to a specimen resulting from exposure to too high an intensity of excitation light can be minimized.

Moreover, in Embodiment 1, when S is greater than the specified threshold value, and the binning mode is selected using 2×2 binning, the signal strength output of the image pickup element 202 will be four times that obtained without binning processing. However, it is also possible to provide a signal strength output of the image pickup element 202 during binning processing with the signal strength being the same as that obtained without binning processing, in which case the exposure time will be longer but the noise level of the output signals from the image pickup element 202 will be reduced by a factor of 4.

Embodiment 2

The characteristic feature of this embodiment is that the illumination light of the microscope 101 is adjusted corresponding to a changed state of the specimen.

Figure 10:
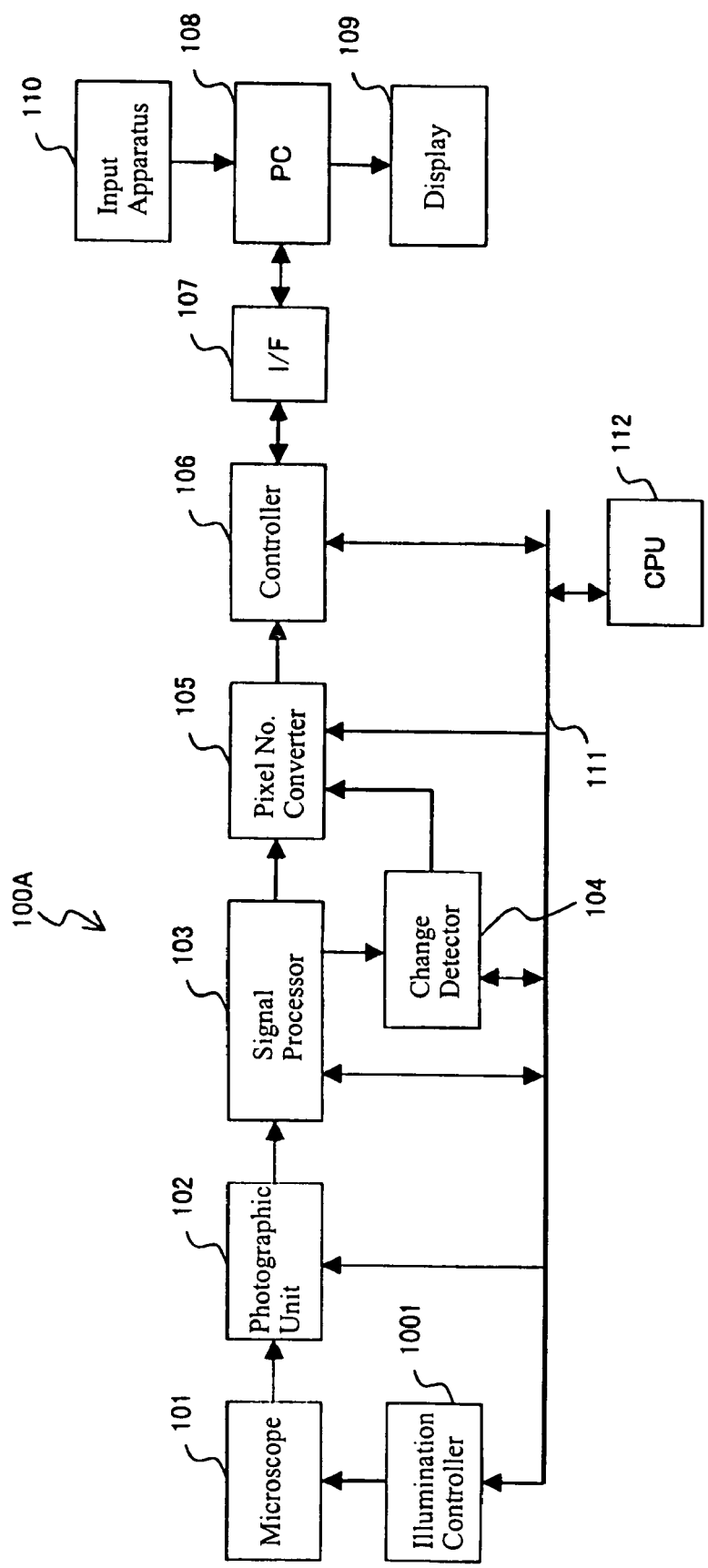
FIG. 10 is a block diagram that shows the components of Embodiment 2 of a microscope system that includes a photographic unit 102, a signal processor 103, a change detector 104, a pixel number converter 105, and other components.

FIG. 10 is a block diagram that shows the components of Embodiment 2 of a microscope system 100A that includes all the components of Embodiment 1. Additionally, Embodiment 2 includes an illumination controller 1001. In order to avoid redundant descriptions of identical components, only the illumination controller 1001 and its operation will be described for this embodiment.

The illumination controller 1001 is electrically connected to the microscope 101 in order to control the amount of illumination light that is incident onto a specimen. For example, neutral density filters may be selectively inserted into the light path so as to control the amount of illumination onto the specimen. The illumination controller 1001 is also electrically connected to the CPU 112 by the control bus 111, and the CPU 112 is electrically connected to, and controlled by, the PC 108.

The operation of Embodiment 2 will now be described, to the extent that it differs from that of Embodiment 1, with reference to FIG. 5. More specifically, since the steps from S501 to S506 of FIG. 5 for this embodiment are the same as in Embodiment 1, further explanation of the steps S501-S506 for this embodiment will be omitted.

If a directive to perform either the motion picture acquisition of images or the time-lapse photography acquisition of images is sent from an input apparatus 110 to the PC 108 and the PC 108 receives the directive (step S507), the CPU 112 will receive the photographic image data from the PC 108 and will establish the threshold value Th (in step S508) in the change detector 104 and transmit a signal to the drive 205 directing the establishment of binning mode in the drive 205.

In step S509, the PC 108 starts an internal timer simultaneously with the commencement of transmission of photographic data to the CPU 112, and the CPU 112 transmits photographic control parameters in accordance with the photographic conditions directed by the PC 108 to the photographic unit 102. At this time, the CPU 112 also transmits a control signal to the illumination controller 1001 that reduces the illumination of the specimen to one-fourth of that which existed for the display of preview images.

At this time, the image pickup element 202 (FIG. 2) photo-electrically converts the incident light that has been relayed onto it from the microscope 101 in accordance with a drive signal generated by the drive 205 and outputs image signals. These image signals are processed in the same manner as described in Embodiment 1 and are subsequently output as digital signals to the pixel number converter 105 and the change detector 104.

The change detector 104 calculates the value S in the same manner as in Embodiment 1, and transmits the result of the comparison (i.e., the K value) along with the threshold value Th to the CPU 112.

As shown in FIG. 11, in the case of there being a large change in the detected image when two frames are compared (K=1), there is no binning processing (none) and pixels are output using the same intensity (I) of illumination light as used for the display of preview images. On the other hand, in the case of there being a small change in the detected image when two frames are compared (K=0), binning processing is performed (such as 2×2 binning processing using one-fourth the normal amount of illumination light ¼ used for the display of preview images). In this manner, the luminous intensities of the calculated pixels that are output during binning processing are made to be at the appropriate level.

In the case where a frame is to be processed using 2×2 binning processing due to the value of K being equal to zero (i.e., a small change from the previous frame), and where the next frame is to be processed using "no binning" due to the value of K being equal to 1 (large change), the CPU 112 transmits a control signal to the drive 205. In response thereto, the drive 205 generates a drive signal that controls the acquiring of images by the image pickup element 202. In addition, in the frame following when K changes from 1 (large change) to zero (small change), the CPU 112 transmits a control signal to the illumination controller 1001 and makes the illumination intensity be one-fourth that used for the display of preview images. Thus, in this case, the pixel number converter 105 outputs input image data in its existent state without executing any processing. Subsequently, the image input to the controller 106 detects the completion of photographic recording by means of the image data flow reaching the PC 108 through the interface 107, and the PC 108 detects the completion of photographic recording by means of an internal timer.

The operation and effect of the second embodiment will now be described. In this embodiment, if there is a sufficient change in the appearance of the detected image when two frames are compared (K=1), an image is acquired wherein there is no reduced-data processing and each frame is acquired and output with the maximum number of pixels (sometimes termed a 'through image'). In the case of there being a small change in the appearance of the detected image when two frames are compared (K=0), an image is acquired wherein binning processing is accomplished and the amount of illumination on the specimen is accordingly reduced so that the output level (brightness) of the image data is at an appropriate level.

Furthermore, this embodiment is able to acquire photographic images with a high degree of resolution using high levels of illumination during a period in which there is a detected change in the appearance of a specimen, while suppressing the level of illumination during periods of no detected change (or only minor detected change), in the appearance of the specimen. Thus, damage to an illuminated specimen is minimized while enabling changes that occur rather rapidly over short time periods to be recorded with good resolution.

Embodiment 3

The characteristic feature of this embodiment is that a region of a photographic image in which a changed state of a specimen is to be monitored and recorded with good resolution may be varied, with the region's location being selected by the operator. In this embodiment, a change detector 104A is provided in lieu of using the change detector 104 of Embodiment 1.

FIG. 12 shows the components of the change detector 104A that applies to this embodiment. The change detector 104A differs from the change detector 104 of Embodiment 1 (shown in FIG. 4) in that it additionally includes an address comparator 1201. The address comparator 1201 is electrically connected as shown in FIG. 12. Address information that designates a specific region of a photographic image that is to be monitored for change in appearance is input to the address comparator 1201 from the CPU 112. In addition, the address comparator 1201 generates an address showing which position the input image data occupies on a photographic image screen, based on a synchronization signal that is input to the address comparator 1201 from the signal processor 103. A comparison is made of the generated address of the address comparator versus the address information from the CPU 112, and the state of the image that is output to the difference detector 402 is changed depending on the results of the comparison.

An explanation of the operation of the third embodiment will now be provided with reference to FIG. 5. In this embodiment steps S501-S504 are the same as in the first embodiment, and thus further explanation of these steps will be omitted. In step S505, an operator, while viewing a displayed image, may indicate a region of particular interest within the image by means of an input apparatus 110, and the PC 108 will display the indicated region on the display 109 of FIG. 1 in a manner as shown in FIG. 13. Simultaneously, address information showing the position occupied by the vertical axis of the screen is transmitted to the CPU 112.

FIG. 13 shows images that may be displayed on the display 109, which may include an indicated region 1302 that includes the specimen image 1304. The indicated region may be input by an operator using an input apparatus (e.g., a mouse) to insure that the indicated region containing the specimen image 1304 is displayed jointly with a specimen 1303 during the display of preview images on the image display screen 1301. At this time, the CPU 112 of FIG. 10 transmits address information of the indicated region to the address comparator 1201.

Referring again to FIG. 5, when a photographic conditions change command occurs in step S505, the photographic parameters are changed in step S506 from those used for acquisition of images during the display of preview images. After adjusting the photographic parameters for a specific image, the steps S507-S509 are the same as in Embodiment 1. Therefore, further explanation of these steps will be omitted.

Referring to FIGS. 1 and 12, specimen image data obtained by the photographic unit 102 (in response to control parameter data from the CPU 112) undergoes various image processing in the signal processor 103 as described previously and is output to the change detector 104A (FIG. 12) and the pixel number converter 105.

Referring to FIG. 12, an address comparator 1201 within the change detector 104A compares the position address of the image data that is received from the signal processor 103 with the address information sent by the CPU 112. When there is conformance, image data is output from the difference detector that is identical to the image data input into the change detector 104A; when there is no conformance, image data having an illumination value of "0" is output to the difference detector 402 (i.e., no image data is output).

As before, the difference detector 402 calculates the frame-integrated value S of the illumination difference between successive frames in the same manner as in Embodiment 1 and outputs the frame-integrated value S to the threshold value discriminator 403. The threshold value discriminator 403 transmits to the CPU 112 the comparison result signal K after comparing the threshold value Th and the integrated value S, and outputs image data corresponding to the selection signal SEL (where SEL is directed from the CPU 112) to the controller 106 for storing motion picture images or time-lapse photography images in the PC 108. This occurs via the interface 107. Since the further steps (through the completion of photographic recording in step S511) are the same as in Embodiment 1, these steps will not be further discussed.

An explanation of the results of the operation of the third embodiment will now be provided. Assume that there are multiple items that are within a microscope's field of view on a photographic screen. For example, assume that there are two specimens 1303 and 1304 as shown in FIG. 13. Assume that the operator selects a region for the apparatus to monitor and record the state of change of one of the specimens, in this case the region 1302. If region 1302 (which includes the specimen 1304), is indicated by the operator, the change detector 104A will detect changes in the specimen, and will calculate the frame-integrated value S of the illumination difference signal of two successive frames on a repeating basis using the illumination values of the region 1302. Thus, even if there is change in the specimen 1303 (since the specimen 1303 is not within the region being monitored for changes in appearance) only the state of change of the specimen 1304 that is within the designated region 1302 (i.e., the object of interest) will be recorded with high resolution. In this manner, photographic image data can be obtained with high resolution of a region of interest when there is a change in appearance of a specimen within the region interest, without generating unwanted photographic image data even where an uninteresting specimen within the view field of the microscope but outside the designated region of interest changes in appearance

Embodiment 4

The characteristic feature of the fourth embodiment is that it changes the compression ratio of the photographic image in a manner that corresponds to a changed state of a specimen.

Figure 14:
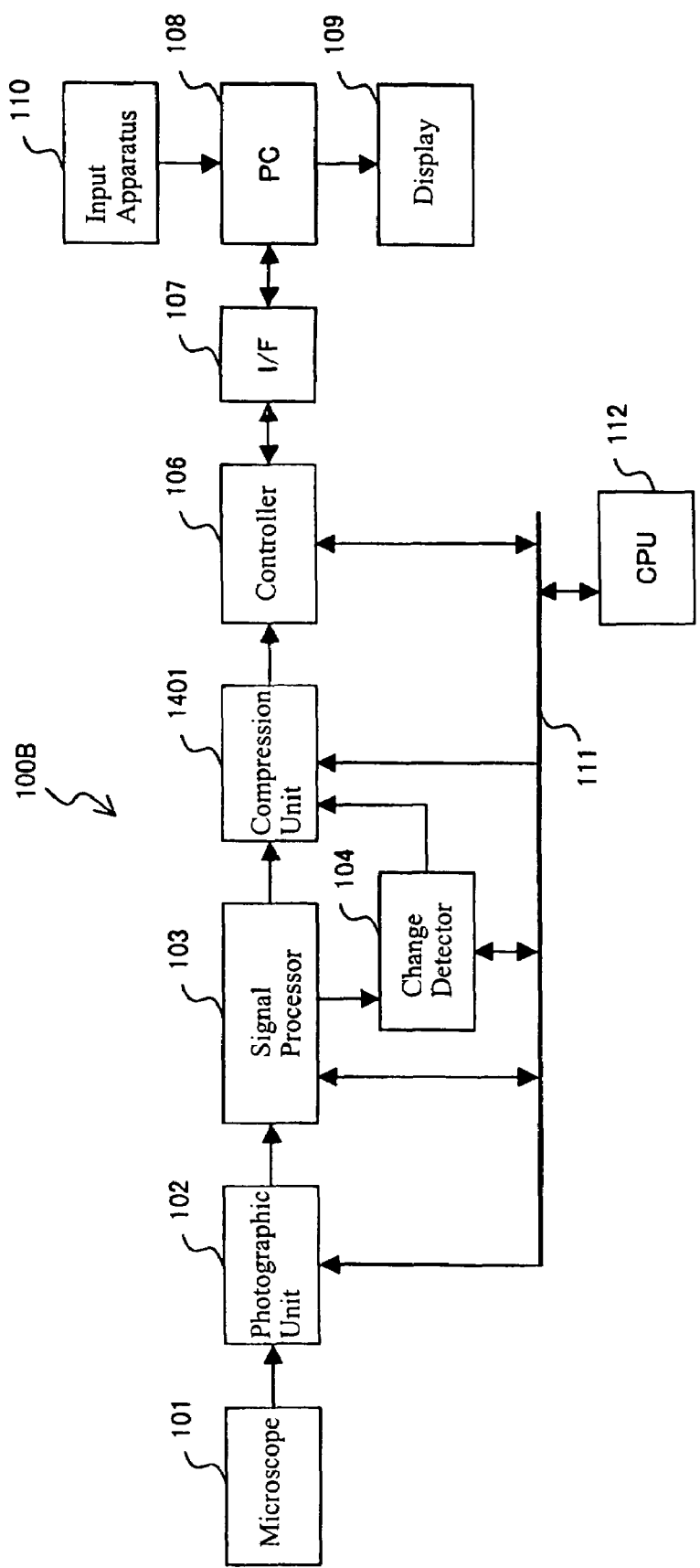
FIG. 14 is a block diagram that shows the components according to Embodiment 4 of a microscope system of the present invention.

FIG. 14 shows the components of the fourth embodiment 100B of the present invention. The components of Embodiment 4 are the same as in Embodiment 1 except that a compression unit 1401 replaces the pixel number converter 105 shown in FIG. 1. In this embodiment as well, the microscope 101 is capable of switching, for example, to a transparent field observation state and to a state that corresponds to each type of microscopic observation, such as fluorescent observation and the like. As before, further explanation of like components will not be given.

As shown in FIG. 14, the compression unit 1401 is electrically connected via the control bus 111 to the signal processor 103, the change detector 104, the controller 106, and the CPU 112. Image data is input to the compression unit 1401 from the signal processor 103, and the comparison result signal K is input to the compression unit 1401 from the change detector 104. Image data may be output from the compression unit 1401 to the controller 106 without being compressed. Also, images that have been compressed by the compression unit 1401 using one of a compression ratio A (large compression ratio) or a compression ratio B (small compression ratio), depending on the comparison result obtained from the change detector 104, may be output to the controller 106.

An explanation will now be provided of the operation of Embodiment 4 with reference to FIG. 5. Steps S501 through S504 are the same as in Embodiment 1, and thus further explanation of these steps will be omitted. Also, at this time, the change detector 104 does not operate, and the compression unit 1401 outputs to the controller 106 image data with "through processing" (i.e., without processing data that has been input from the signal processor 103).

If motion picture recording for a specified period of time is directed (in step S507), the PC 108 initially transmits control data to the CPU 112 via the interface 107. At the same time that the CPU 112 establishes (in step S508) the threshold value Th for the received image data in the change detector 104, a signal is sent indicating a high compression ratio A should be used in the compression unit 1401.

In step S509, the PC 108 starts an internal timer and simultaneously transmits control data to the CPU 112 that directs the commencement of photographic recording, at which time the change detector 104 commences operation. At this time, light from the microscope 101 that is incident on the image pickup element is photo-electrically converted by the image pickup element 202 and is processed in the same manner as for the display of preview images, and is output to the compression unit 1401 and the change detector 104.

The change detector 104, as in the Embodiment 1, calculates the frame-integrated value S of the illumination difference between successive frames. As before, in the threshold value discriminator 403, a comparison is made of the frame-integrated value S of the illumination difference versus a threshold value Th. If S is greater than or equal to Th, a comparison result signal K having a value of "1" is transmitted to the compression unit 1401 and the CPU 112 as a digital signal. If not, a comparison result signal K having a value of "0" is similarly transmitted to the compression unit 1401 and the CPU 112. However, since an initial first frame does not have data of a previous frame, a signal K having a value of "0" is initially output.

Figure 15:
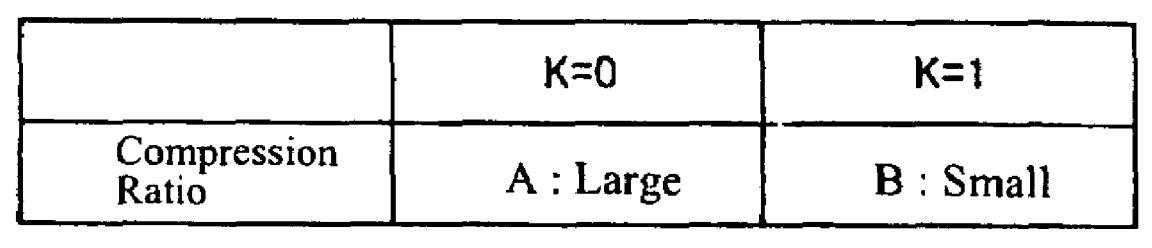

Depending on the value of the comparison result signal K that is received, the compression unit 1401 compresses the image using a compression ratio as shown in FIG. 15. In other words, when the integrated value S is determined to be greater than or equal to the established threshold value Th (i.e., K=1), the image is compressed with a small compression ratio B and the output is sent to the controller 106. On the other hand, if the integrated value of S is determined to be smaller than the threshold value of Th, (i.e., K=0), the image data is compressed with a large compression ratio A and the output is sent to the controller 106.

Subsequently, the image data transmitted to the controller 106 is transmitted to PC 108 via the interface 107 until an internal timer of the PC 108 detects that a specified period of time has elapsed. Since the operation to the completion (in step S511) of motion picture recording using a specific file format is the same as in Embodiment 1, further explanation of these steps will be omitted.

An explanation will now be provided concerning the operation and results of Embodiment 4. In Embodiment 4, if the frame-integrated value S of the illumination difference between successive frames is determined to be greater than or equal to an established threshold value Th (i.e., if the comparison result signal K equals 1), the change state of the specimen will be detected as being great and image data will be created in which the image is compressed using a small compression ratio B. On the other hand, if the frame-integrated value S of the illumination difference between successive frames is determined to be smaller than the established threshold value Th (i.e., if K=0), then the changed state of the specimen will be detected as being small and image data will be created in which the image is compressed with a large compression ratio A. Therefore, an image of high-quality (i.e., low compression) can be recorded during a period in which the appearance of a specimen changes.

Embodiment 5

Figure 16:
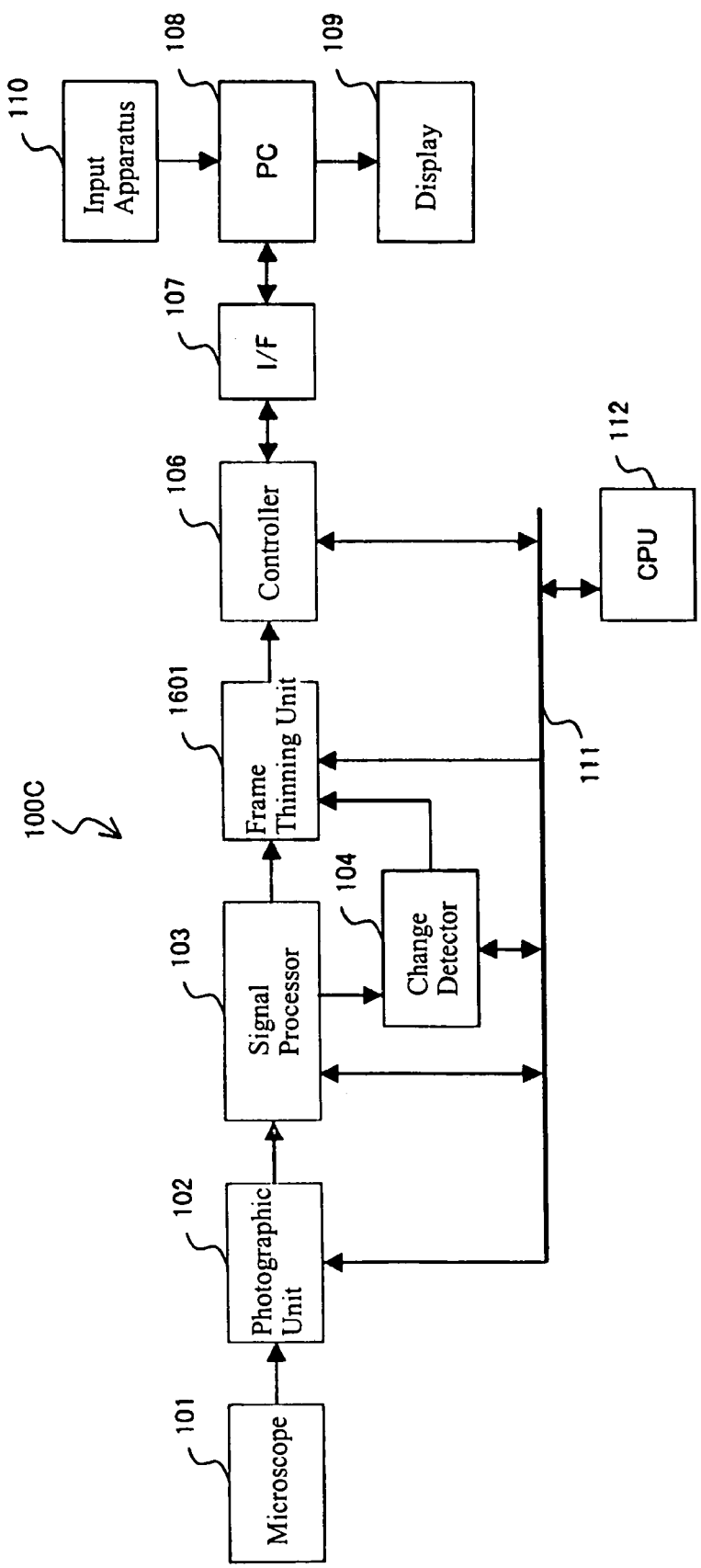
FIG. 16 is a block diagram that shows the components of Embodiment 5 of a microscope system according to the present invention.

The characteristic feature of this embodiment is changing the frame-thinning ratio of image acquisition depending on a changed state of a specimen. FIG. 16 shows the components of the microscope system 100C according to Embodiment 5 of the present invention, which components are the same as in Embodiment 1 except that a frame-thinning unit 1601 is substituted for the pixel number converter 105. Also, the electrical connections of components of this embodiment are the same as in Embodiment 1 once the frame-thinning unit 1601 is substituted for the pixel number converter 105. Therefore, redundant explanations of these items will be omitted. The frame-thinning unit 1601 is provided with an internal counter (not illustrated) that counts the frame numbers using the synchronization signal. The frame-thinning unit 1601 reads the comparison result signal K from the frame change detector 104 using the synchronization signal, based on its frame counter value. As shown in FIG. 17, the input image data from the signal processor 103 is processed using either N frame cycle thinning or no-thinning, and is then output to controller 106.

The operation of Embodiment 5 will now be described with reference to FIG. 5. An explanation of steps S501 through S506 will be omitted since these steps are the same for Embodiment 5 as described for previous embodiments. However, during steps S501 through S506, the change detector 104 is not operated and no thinning of the image data input from the signal processor 103 is accomplished in the frame-thinning unit 1601. Therefore, image data is acquired and output to controller 106 in the same manner as for the display of preview images.

If the commencement of either (1) motion picture image acquisition or (2) time-lapse photography acquisition for image recording is directed (in step S507) for a specified period of time, initially the PC 108 transmits the photographic image data to the CPU 112, which in turn establishes (in step S508) the threshold value Th in the change detector 104 corresponding to received photographic image data. At the same time, a signal is sent to the frame-thinning unit 1601, directing N frame synchronized thinning of the image data that is suitable for data reduction.

In step S509, the PC 108 starts an internal counter and simultaneously transmits photographic image data directing the commencement of photographic recording to the CPU 112. At this time, the change detector 104 commences operation. Incident light from the microscope 101 is photo-electrically converted by the image pickup element 202 into a signal that is then processed in the same manner as for the display of preview images, and is output to the frame-thinning unit 1601 and the change detector 104.

The change detector 104 calculates the value S in the same manner as in Embodiment 1. A comparison is then made with the threshold value Th in the threshold value discriminator 403. As before, if the value of the frame-integrated value signal S is greater than or equal to Th, a comparison result signal K is made equal to "1" and transmitted to the frame-thinning unit 1601 and the CPU 112 as a digital signal. Otherwise, the comparison result signal K is made equal to "0" and is transmitted to the frame-thinning unit 1601 and the CPU 112 as a digital signal. As before, since the initial first frame does not have data of a previous frame, a value of K equal to "0" is initially output.

The frame-thinning unit 1601 accomplishes frame-thinning depending on the output signal K of the change detector 104 as set forth in FIG. 17. In other words, if the signal K is "1", images are transmitted without thinning. On the other hand, if the signal K is "0", (i.e., there is little change in appearance between successive frames), thinned images (that are thinned during a cycle of N frames) are output to the controller 106.

Subsequently, the image data transmitted to the controller 106 is transmitted to PC 108 via the interface 107 until the end of the period of photographic recording established by the internal timer of PC 108 is detected. In the PC 108, since the operation to the completion (in step S511 of FIG. 5) of the series of photographic operations that is accomplished in a specific motion picture file format is the same as that of Embodiment 1, redundant explanation of these steps will be omitted.

An explanation will now be provided concerning the operation and results of Embodiment 5. FIG. 18 illustrates the frame-integrated value S that is calculated in the change detector 104, the threshold value Th, and thinning processing that occurs in the frame-thinning unit 1601 of this embodiment. In this instance, the frame thinning cycle has a duration of five frames, and the thick vertical lines shown in FIG. 18 are frames in which image data is output.

Since in frame 0 (i.e., before frame 1), the fifth frame, and the 15th frame it is detected that K equals "0" (i.e., in these frames the change in appearance of the specimen as compared to the previous frame is such that S<Th), thinning processing subsequently takes place in frames 1-4, 6-9, and 16-19. On the other hand, since frame 10 is such that S>Th, the specimen change is detected as being great and thus K is set to "1". Therefore, the subsequent frames 11-14 are output without thinning processing.

According to this embodiment, photographic images are not acquired (and thus are not recorded) during periods in which observations are not desired, in other words, during periods in which there is no change in the specimen state. However, during periods of interest to an observer (i.e., when the specimen state is changing), photographic images are acquired without thinning processing. Thus, images are recorded at a high frame rate (i.e., at short intervals) during periods of interest to an observer, thereby enabling efficient photographic recording with minimal needless use of storage capacity.

Embodiment 6

The characteristic feature of Embodiment 6 is that multiple threshold values may be selected by the operator for recording the state of change of a specimen. FIG. 19 is a block diagram showing the components of the change detector 104B according to this embodiment. The change detector 104B differs from the change detector 104 of Embodiment 1 in that the change detector 104B includes a threshold value selector 1901. The threshold value selector 1901 is electrically connected via the control bus 111 to the CPU 112, and it is also electrically connected to the threshold value discriminator 403. The threshold value selector 1901 houses a register (not shown) that stores multiple threshold values (Th 1, Th 2, . . . Th N), which are respectively designated by the CPU 112 through the control bus 111. Also, the threshold value selector is electrically connected to the output end of the respective registers, and selected threshold values (any of Th 1, Th 2, . . . Th N) are output to the threshold value discriminator 403 by means of a threshold value selection signal SEL from the CPU 112.

The operation of this embodiment will now be described with reference to FIG. 5. Steps S501-S506 of this embodiment are the same as those of the first embodiment, and thus further explanation of these steps will be omitted, except to note that in this embodiment the change detector 104 does not operate. In this embodiment, if motion picture photographic recording is directed (in step S507) for a specified period, the PC 108 will transmit image data to the CPU 112, which establishes multiple threshold values (Th 1, Th 2, . . . Th N) in the internal register of the threshold value selector 1901 corresponding to the received data. Next, the PC 108 displays the multiple threshold values (Th 1, Th 2, . . . Th N) that have been established by the threshold value selector 1901 on the display 109. If any of the displayed threshold values are selected (by the operator using the input apparatus 110), the CPU 112 transmits a threshold value selection signal SEL to the PC 108. If a selected threshold value (provisionally assumed to be Th a) is output to the threshold value discriminator 403, the threshold value setting is completed (in step S508). At the same time, a signal SEL (which directs either thinning or binning) is transmitted to the pixel number converter 105 and to the drive 205.

Since the steps from when the PC 108 (in step S509) starts an internal timer and simultaneously transmits image data directing the commencement of photography to the CPU 112 until the completion of photographic recording (in step S511) are the same as in Embodiment 1, further explanation of these steps will be omitted.

Figure 20:
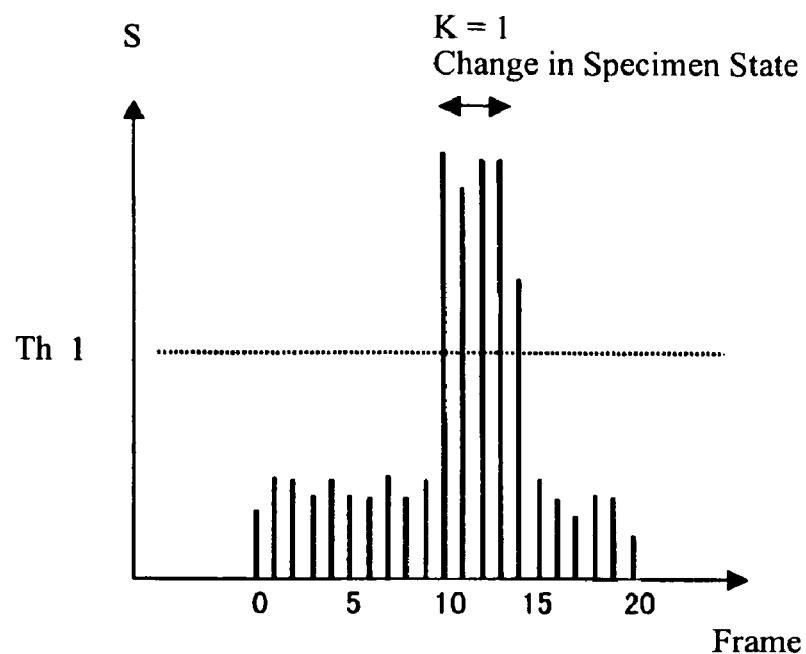
FIG. 20 illustrates the manner in which the frame-integrated value S of the illumination difference that is calculated and output from the difference detector within the change detector 104B of FIG. 19 changes with frame number during successive frames at a time of bright field observation.

The operation and results of this embodiment will now be discussed. FIG. 20 illustrates the manner in which the frame-integrated value S of the illumination difference that is calculated and output from the difference detector within the change detector 104B of FIG. 19 changes with frame number during successive frames at a time of bright field observation. Generally, with bright field observation the image of a specimen is brighter, and thus an adequate exposure can be obtained without elevating the gain of the image pickup element. Therefore, the amount of noise in the recorded photographic images is small. Furthermore, even when a low threshold value (Th 1) is established, minute changes in the specimen can be detected without erroneously detecting noise components as a specimen change event.

Figure 21:
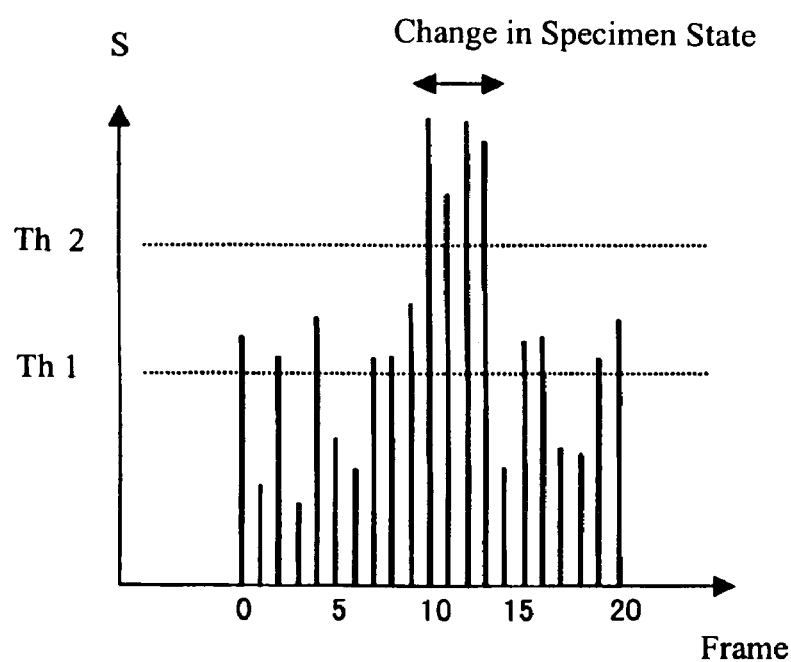
FIG. 21 illustrates the manner in which the frame-integrated value S of the illumination difference that is calculated and output from the difference detector within the change detector 104B of FIG. 19 changes with frame number during successive frames at a time of fluorescent light observation.

FIG. 21 illustrates the manner in which the frame-integrated value S of the illumination difference that is output from the difference detector within the change detector 104B of FIG. 19 changes with frame number during successive frames at a time of fluorescent light observation. Generally, with fluorescent light observation, the image of a specimen will be relatively dark since the excitation light should be weak in order to prevent photobleaching of the specimen. Therefore, in order to provide a proper exposure, the gain of the image pickup element is increased relative to that used for bright field observation. This generates optical 'noise' in the displayed image. If the threshold value Th is established to be low (Th 1), the possibility of erroneously detecting noise components as a change in appearance of the specimen is high. Therefore, a high threshold value (Th 2) that is higher than the threshold value Th 1 is established in the case of fluorescent light observation, and erroneous detection of noise components can be reduced. Furthermore, according to this embodiment, since the threshold value Th may be selected from among multiple levels depending on the microscope examination method employed, optimal photographic image recording can be obtained.

The invention being thus described, it will be obvious that the same may be varied in many ways. For example the binning mode in Embodiments 1-3 and 6 is not restricted to the 4-pixel calculation of 2×2 pixel arrays, but changes are also possible relative to a 16-pixel calculation of 4×4 pixel arrays, or a 64-pixel calculation of 8×8 pixel arrays (as well as other binning arrangements). The exposure time at this time in comparison to when there is no binning is further shortened to 1/16th and 1/64th, respectively. For this reason, at the time of observing a dark specimen with fluorescent light, it is possible to acquire an adequate frame rate for motion picture photographic recording using a sufficiently short exposure time. In addition, in Embodiment 3, the designated regions are not restricted to rectangular regions. Furthermore, the number of designated regions of interest is not restricted to just one, as multiple regions of interest may also be designated. In this manner, the designated regions may be flexibly established corresponding to complex changes in a specimen. In addition, the compression ratio in Embodiment 4, the photographic interval in Embodiment 5, and the multiple threshold values of Embodiment 6 are not restricted to the types discussed above. For example, by establishing respective compression ratios relative to multiple threshold values in Embodiment 6, appropriate photographic images can be recorded relative to various photographic environments. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An image acquisition apparatus for use with a microscope comprising:
    an image pickup element that acquires images obtained using the microscope;
    a change detector that detects the amount of change between an image acquired by the image pickup element and a subsequent image acquired by the image pickup element; and
    a binning means that performs binning processing by calculating and outputting cumulative pixel information of multiple proximate pixels of an input image as an output pixel so as to form a reduced-data output image, or that outputs pixel information of an input image as output data without reduced-data processing, based on the amount of change detected by the change detector;
    wherein
    reduced-data images as well as images that have not been reduced are output from the image acquisition apparatus.

2. The image acquisition apparatus of claim 1, and further comprising:
    a thinning means that performs thinning processing by outputting only specified pixels from among multiple proximate pixels of an input image or deletes one or more entire frames of pixels so as to form reduced-data output images, or that outputs the input image without performing reduced-data processing, based on the amount of change detected by the change detector; and
    a selection means that selectively executes either binning processing or thinning processing as the type of data-reduction processing to be performed by the image acquisition apparatus based on a specified value;
    wherein
    reduced-data images as well as images that have not been reduced are output from the image acquisition apparatus.

3. The image acquisition apparatus of claim 1, and further including an address comparator that enables a region of an image to be designated by the operator for which the change detector detects the amount of change within said region.

4. The image acquisition apparatus of claim 2, and further including an address comparator that enables a region of an image to be designated by the operator for which the change detector detects the amount of change within said region.

5. The image acquisition apparatus of claim 1, wherein a threshold value that is used by the change detector may be selected from among multiple values.

6. The image acquisition apparatus of claim 2, wherein a threshold value that is used by the change detector may be selected from among multiple values.

7. An image recording system comprising:
    the image acquisition apparatus as set forth in claim 1;
    a microscope that provides images of a specimen as input to said image acquisition apparatus; and
    a storage means that stores image data output by said image acquisition apparatus.

8. An image recording system comprising:
    the image acquisition apparatus as set forth in claim 2;
    a microscope that provides images of a specimen as input to said image acquisition apparatus; and
    a storage means that stores image data output by said image acquisition apparatus.

9. An image recording system comprising:
    the image acquisition apparatus as set forth in claim 3;
    a microscope that provides images of a specimen as input to said image acquisition apparatus; and
    a storage means that stores image data output by said image acquisition apparatus.

10. An image recording system comprising:
    the image acquisition apparatus as set forth in claim 4;
    a microscope that provides images of a specimen as input to said image acquisition apparatus; and
    a storage means that stores image data output by said image acquisition apparatus.

11. The image recording system of claim 7, wherein the image acquisition apparatus acquires images at a slower rate than the rate used for ordinary motion picture photography so that time-lapse images are recorded.

12. The image recording system of claim 8, wherein the image acquisition apparatus acquires images at a slower rate than the rate used for ordinary motion picture photography so that time-lapse images are recorded.

13. The image recording system of claim 7, and further including an illumination controller that enables an illumination on the object to be controlled so that, during binning processing of image data, the illumination is reduced as compared with that for thinning processing.

14. The image recording system of claim 8, and further including an illumination controller that enables an illumination on the object to be controlled so that, during binning processing of image data, the illumination is reduced as compared with that for thinning processing.

15. An image storage method for storing photographic images of an object that is observed with a microscope, said method comprising the following steps, performed in the order indicated:
- (a) acquiring images obtained using the microscope by using an image pickup element to pick up relayed images from the microscope;
- (b) detecting the amount of change between an image acquired by the image pickup element and a subsequent image acquired by the image pickup element; and
- (c) performing reduced-data processing according to one of the sub-steps (1) or (2) below, or outputting an input image without performing reduced-data processing, based on the amount of change detected in step (b), wherein one of the substeps (1) or (2) is selected based on a specified value:
  - (1) performing binning processing by calculating cumulative pixel information of multiple proximate pixels of an input image and outputting an output pixel so as to form a reduced-data output image, or
  - (2) performing thinning processing by outputting only specified pixels from among multiple proximate pixels of an input image so as to form a reduced-data output image;
- (d) storing images that include reduced-data images produced by sub-steps (c1) or (c2) above as well as images that are acquired in step (a) above that are not subject to data-reduction.

* * * * *